(12) United States Patent
Lauenstein

(10) Patent No.: US 10,365,366 B2  
(45) Date of Patent: Jul. 30, 2019

(54) ADJUSTABLE RANGE VIEWING OF SONAR IMAGERY DURING TRIP REPLAY

(71) Applicant: NAVICO HOLDING AS, Egersund (NO)

(72) Inventor: Michael Lauenstein, Bayport, MN (US)

(73) Assignee: NAVICO HOLDING AS, Egersund (NO)

( * ) Notice: Subject to any disclaimer, the term of this patent is extended or adjusted under 35 U.S.C. 154(b) by 464 days.

(21) Appl. No.: 15/188,605

(22) Filed: Jun. 21, 2016

(65) Prior Publication Data

US 2017/0363739 A1 Dec. 21, 2017

(51) Int. Cl.
- *G01S 15/00* (2006.01)
- *G01S 15/89* (2006.01)
- *G01S 7/56* (2006.01)

(52) U.S. Cl.
CPC ............ *G01S 15/8902* (2013.01); *G01S 7/56* (2013.01)

(58) Field of Classification Search
USPC ........................................................ 367/111
See application file for complete search history.

(56) References Cited

U.S. PATENT DOCUMENTS

| | | |
|---|---|---|
| 3,752,431 A | 8/1973 | McBride |
| 4,047,147 A | 9/1977 | Wood et al. |
| 4,281,404 A | 7/1981 | Morrow, Jr. et al. |
| 4,282,590 A | 8/1981 | Wingate |
| 4,829,493 A | 5/1989 | Bailey |
| 4,879,697 A | 11/1989 | Lowrance et al. |
| 4,995,010 A | 2/1991 | Knight |
| 5,253,220 A | 10/1993 | Wilson, Sr. |
| 5,524,637 A | 6/1996 | Erickson |
| 6,130,641 A | 10/2000 | Kraeutner et al. |
| 6,222,449 B1 * | 4/2001 | Twining ............. A01K 97/00 340/539.11 |
| 6,595,315 B1 * | 7/2003 | Fujimoto ............ G01S 7/6218 181/124 |
| 6,628,569 B1 * | 9/2003 | Steiner ............... G01S 15/96 367/111 |
| 7,161,872 B2 * | 1/2007 | Kuriyama ........... A01K 89/00 367/111 |

(Continued)

OTHER PUBLICATIONS

Abhimanyu Ghoshal; Google's latest iOS app creates beautiful motion GIFs from your Live Photos; downloaded Aug. 31, 2016; 3 pgs. http://thenextweb.com/google/2016/06/08/googles-latest-ios-app-creates-beautiful-motion-gifs-live-photos/#gref.

(Continued)

*Primary Examiner* — James R Hulka  
(74) *Attorney, Agent, or Firm* — Nelson Mullins Riley & Scarborough LLP

(57) ABSTRACT

Sonar imagery captured during a trip on a body of water can be played back to users, forming a trip replay. However, since the depth of the body of water varies drastically over the course of the trip, the resulting sonar image captured and played over the trip replay may result in loss of detail near shallow depths (even though such detail was captured and is available). Embodiments of the present invention seek to provide the ability to zoom in on portions of the sonar image during trip replay. Additionally, further zoom features, such as bottom lock and canopy lock, provide additional functionality.

21 Claims, 6 Drawing Sheets

(56) References Cited

U.S. PATENT DOCUMENTS

| | | |
|---|---|---|
| 7,224,642 B1 | 5/2007 | Tran |
| 7,236,426 B2 | 6/2007 | Turner et al. |
| 8,417,451 B2 | 4/2013 | Hersey et al. |
| 9,135,731 B2 * | 9/2015 | Lauenstein ............. G06T 17/05 |
| 9,430,497 B2 * | 8/2016 | Lauenstein ....... G06F 17/30241 |
| 2004/0097802 A1 * | 5/2004 | Cohen ................ A61B 5/04004 |
| | | 600/411 |
| 2004/0249860 A1 * | 12/2004 | Stechschulte .......... A01K 97/00 |
| 2005/0162976 A1 | 7/2005 | Kuriyama et al. |
| 2005/0211812 A1 | 9/2005 | Nakagawa et al. |
| 2006/0018197 A1 | 1/2006 | Burczynski et al. |
| 2006/0050613 A1 | 3/2006 | Turner |
| 2006/0123050 A1 | 6/2006 | Carmichael |
| 2007/0025591 A1 | 2/2007 | Rhoads et al. |
| 2007/0223310 A1 | 9/2007 | Tran |
| 2008/0080317 A1 | 4/2008 | Inouchi et al. |
| 2010/0036880 A1 | 2/2010 | Carpenter |
| 2010/0141518 A1 | 6/2010 | Hersey et al. |
| 2012/0232719 A1 | 9/2012 | Salmon et al. |
| 2014/0032479 A1 | 1/2014 | Lauenstein et al. |
| 2014/0071167 A1 | 3/2014 | Lauenstein et al. |
| 2015/0054828 A1 | 2/2015 | Bailey |
| 2015/0057929 A1 | 2/2015 | Bailey |
| 2015/0206327 A1 | 7/2015 | Lauenstein et al. |

OTHER PUBLICATIONS

Jquery Image Zoom Plugin Examples; <www.elevateweb.co.uk/image-zoom/examples> retrieved on Jun. 23, 2016.

* cited by examiner

ADJUSTABLE RANGE VIEWING OF SONAR IMAGERY DURING TRIP REPLAY

FIELD OF THE INVENTION

Embodiments of the present invention relate generally to sonar systems and, more particularly, to systems, assemblies, and associated methods for adjustable range viewing of sonar imagery during trip replay.

BACKGROUND OF THE INVENTION

Sonar (SOund Navigation And Ranging) has long been used to detect waterborne or underwater objects. For example, sonar devices may be used to determine depth and bottom topography, detect fish, locate wreckage, etc. Sonar beams, from a transducer assembly, can be transmitted into the underwater environment. The sonar signals reflect off objects in the underwater environment (e.g., fish, structure, sea floor bottom, etc.) and return to the transducer assembly, which converts the sonar returns into sonar data that can be used to produce an image of the underwater environment.

In some instances, it may be difficult to discern underwater features, particularly when a long track of sonar imagery is played back. Applicant has developed methods and systems detailed herein to improve viewing capabilities of the resulting sonar images.

BRIEF SUMMARY OF THE INVENTION

Sonar system users often want the ability to gather and replay (review) sonar data that was received along an entire trip on a body of water (e.g., trip replay). Notably, the sonar image shown on the screen accounts for the entire range of possible depths of the body of water traveled. However, since the depth varies drastically over the course of the trip, the resulting sonar image played during the trip replay may result in loss of detail near shallow depths. For example, sonar detail between 0 feet and 5 feet (such as for shallow water) may not be visible because the entire range of depths accounts for the depth at the middle of the lake (e.g., 100 feet). In this regard, even though the detail between 0 feet and 5 feet was captured when the watercraft was in the shallow water, it is not discernible during trip replay because the depth range goes to at least 100 feet (to account for displaying sonar imagery when the trip replay gets to the portion of the trip when the watercraft was in the middle of the lake). Embodiments of the present invention seek to provide the ability to zoom in on portions of the sonar image during trip replay. Additionally, further zoom features, such as bottom lock and canopy lock, provide additional functionality.

In an example embodiment of the present invention, an apparatus is provided. The apparatus comprises a processor and a memory including computer program code stored thereon, the memory and the computer program code are configured to, with the processor, cause the apparatus to retrieve trip replay data associated with a past trip of a user of a watercraft on a body of water. The trip replay data includes track data associated with a traveled path of the watercraft during the past trip and sonar image data associated with sonar images that were captured by a sonar system attached to the watercraft during the past trip. The computer program code is further configured, when executed, to cause the apparatus to display, on a first portion of a screen, the track data on a chart such that the traveled path of the watercraft during the past trip is displayed over the chart. The computer program code is further configured, when executed, to cause the apparatus to determine the position of the watercraft along the traveled path. The computer program code is further configured, when executed, to cause the apparatus to display, on a second portion of the screen, the sonar image data captured at the position of the watercraft. The computer program code is further configured, when executed, to cause the apparatus to receive user input indicating a desire to zoom in on a portion of the sonar image data being displayed. The computer program code is further configured, when executed, to cause the apparatus to display a zoomed in view of the portion of the sonar image data.

In some embodiments, the user input further indicates a desire to lock the zoomed in view onto a bottom of the body of water. In such embodiments, the memory and the computer program code may be further configured to, with the processor, cause the apparatus to determine a depth associated with the bottom of the body of water at the position of the watercraft, wherein the position of the watercraft corresponds to the displayed sonar image data. Additionally, the memory and the computer program code may be further configured to, with the processor, cause the apparatus to determine, based on the determined depth, the portion of the sonar image data to be zoomed in on such that the bottom of the body of water is within the portion of the sonar image data. Additionally, the memory and the computer program code may be further configured to, with the processor, cause the apparatus to, as the position of the watercraft changes, automatically determine the portion of the sonar image data to be zoomed in on such that the bottom of the body of water is within the portion of the sonar image data to cause the zoomed in view to lock onto the bottom of the body of water as the position of the watercraft and corresponding displayed sonar image data changes.

In some embodiments, the user input further indicates a desire to lock the zoomed in view onto vegetation within the body of water. In such embodiments, the memory and the computer program code may be further configured to, with the processor, cause the apparatus to determine a depth associated with vegetation within the body of water at the position of the watercraft, wherein the position of the watercraft corresponds to the displayed sonar image data. Additionally, the memory and the computer program code may be further configured to, with the processor, cause the apparatus to determine, based on the determined depth, the portion of the sonar image data to be zoomed in on such that the vegetation within the body of water is within the portion of the sonar image data. Additionally, the memory and the computer program code may be further configured to, with the processor, cause the apparatus to, as the position of the watercraft changes, automatically determine the portion of the sonar image data to be zoomed in on such that the vegetation within the body of water is within the portion of the sonar image data to cause the zoomed in view to lock onto the vegetation within the body of water as the position of the watercraft and corresponding displayed sonar image data changes.

In some embodiments, the memory and the computer program code are further configured to, with the processor, cause the apparatus to determine a lowest point of a bottom of the body of water within the sonar image data and remove a portion of the sonar image data below the lowest point of the bottom from the trip replay data to enable a higher resolution image of remaining sonar image data.

In some embodiments, the received user input includes hovering over the portion of the sonar image data being displayed, and the memory and the computer program code are further configured to, with the processor, cause the apparatus to display the zoomed in view of the portion of the sonar image data by displaying a separate pop-up window of the zoomed in view of the portion of the sonar image data.

In some embodiments, the memory and the computer program code are further configured to, with the processor, cause the apparatus to display the zoomed in view of the portion of the sonar image data by replacing the sonar data that was being displayed on the second portion of the screen with the zoomed in view of the portion of the sonar image data.

In some embodiments, the memory and the computer program code are further configured to, with the processor, cause the apparatus to receive second user input indicating a desire to pan the portion of the sonar image data that is being zoomed in on in one of an up direction, a down direction, a left direction, or a right direction, and cause panning of the zoomed in view of the portion of the sonar image data in the indicated up direction, down direction, left direction, or right direction.

In another example embodiment of the present invention, a method is provided. The method includes retrieving trip replay data associated with a past trip of a user of a watercraft on a body of water. The trip replay data includes track data associated with a traveled path of the watercraft during the past trip and sonar image data associated with sonar images that were captured by a sonar system attached to the watercraft during the past trip. The method further includes displaying, on a first portion of a screen, the track data on a chart such that the traveled path of the watercraft during the past trip is displayed over the chart. The method further includes determining the position of the watercraft along the traveled path. The method further includes displaying, on a second portion of the screen, the sonar image data captured at the position of the watercraft. The method further includes receiving user input indicating a desire to zoom in on a portion of the sonar image data being displayed. The method further includes displaying a zoomed in view of the portion of the sonar image data. Example methods of the present invention may also include additional embodiments as described herein, such as described above with respect to the example apparatus.

In yet another example embodiment of the present invention, a computer-readable medium is provided. The non-transitory computer-readable medium is comprised of at least one memory device having computer program instructions stored thereon, the computer program instructions being configured, when run by a processor, to retrieve trip replay data associated with a past trip of a user of a watercraft on a body of water. The trip replay data includes track data associated with a traveled path of the watercraft during the past trip and sonar image data associated with sonar images that were captured by a sonar system attached to the watercraft during the past trip. The computer program instructions are further configured, when run by the processor, to display, on a first portion of a screen, the track data on a chart such that the traveled path of the watercraft during the past trip is displayed over the chart. The computer program instructions are further configured, when run by the processor, to determine the position of the watercraft along the traveled path. The computer program instructions are further configured, when run by the processor, to display, on a second portion of the screen, the sonar image data captured at the position of the watercraft. The computer program instructions are further configured, when run by the processor, to receive user input indicating a desire to zoom in on a portion of the sonar image data being displayed. The computer program instructions are further configured, when run by the processor, to display a zoomed in view of the portion of the sonar image data. Example computer-readable medium of the present invention may also include additional embodiments as described herein, such as described above with respect to the example apparatus.

BRIEF DESCRIPTION OF THE DRAWINGS

Figure 1:
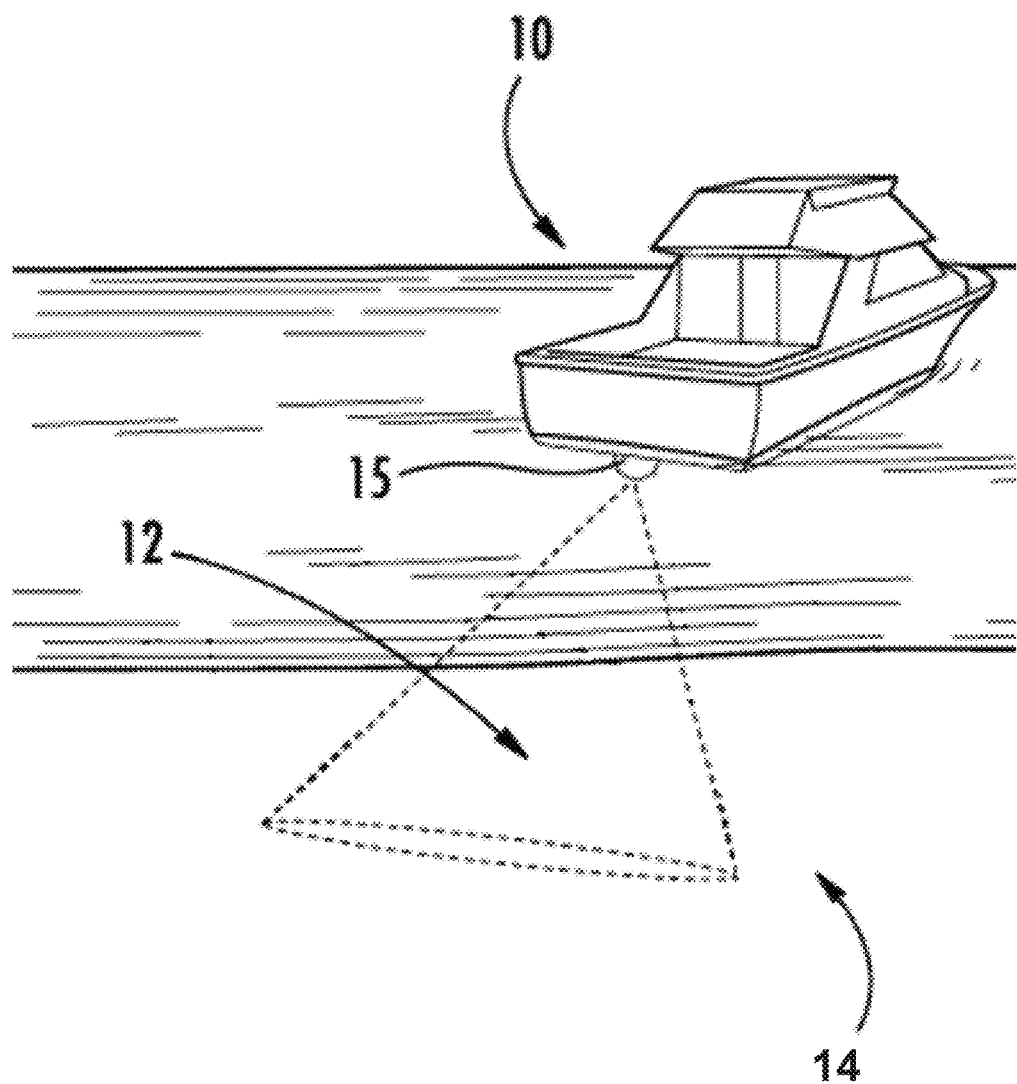
Figure 2:
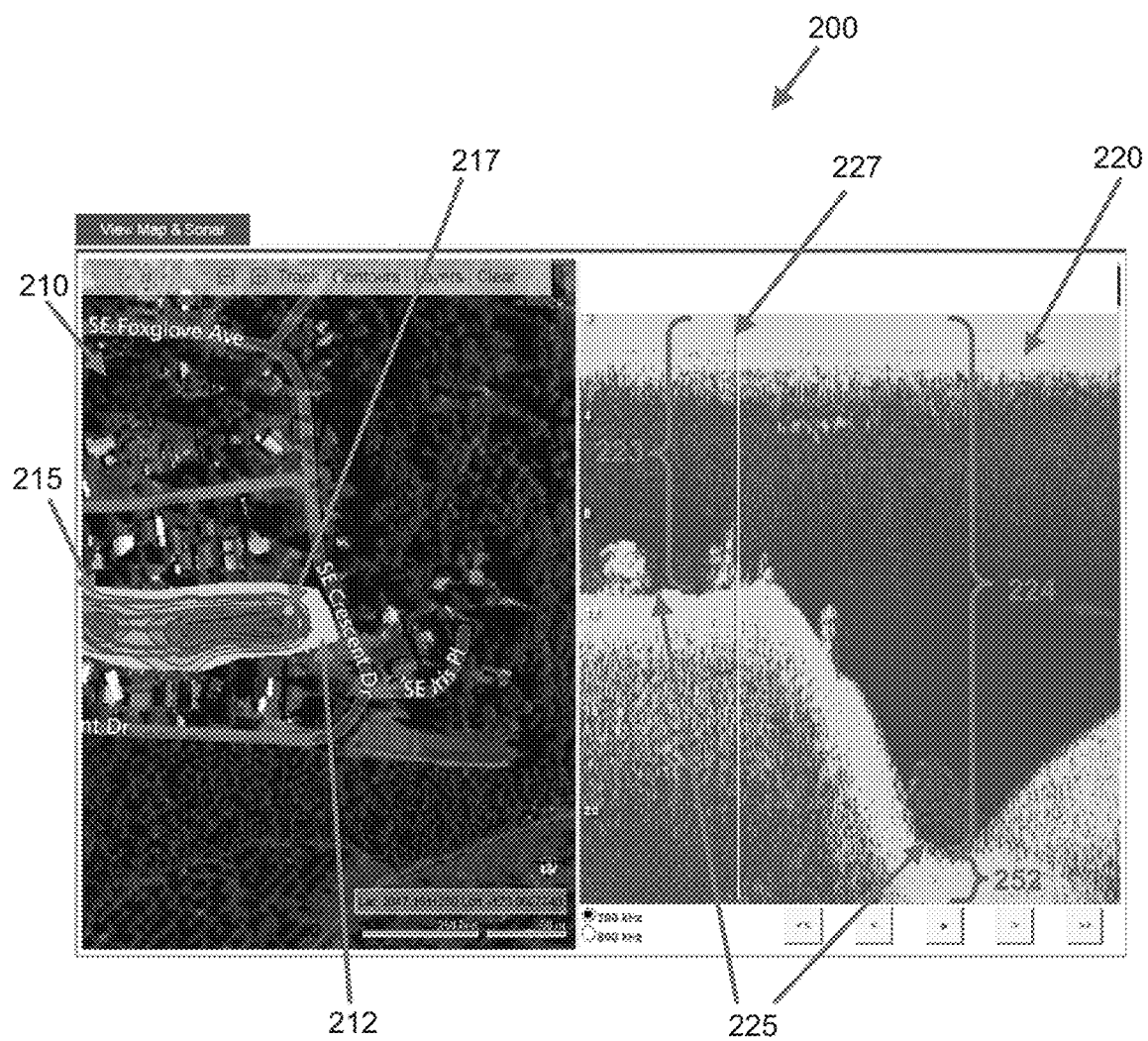
Figure 3:
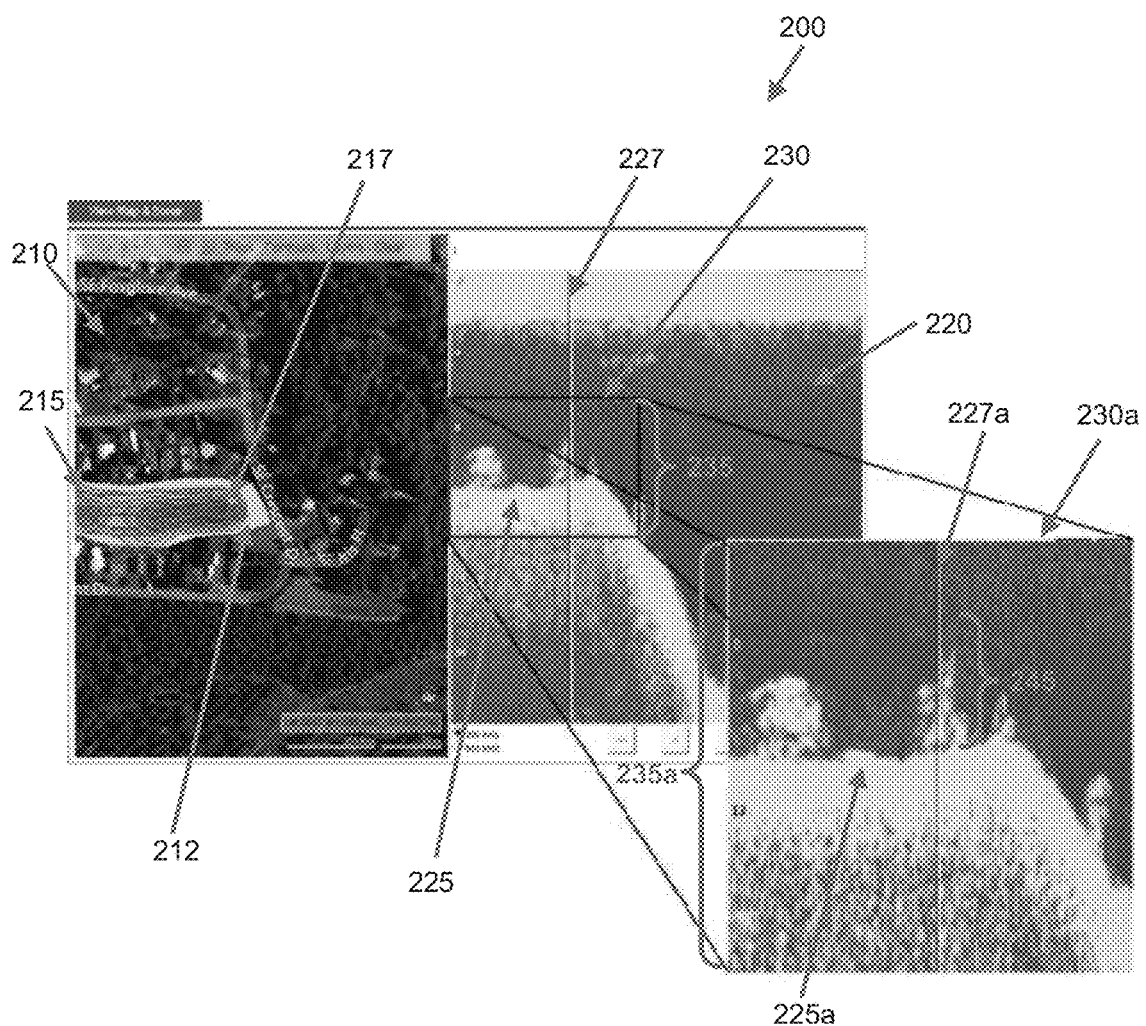
Figure 4:
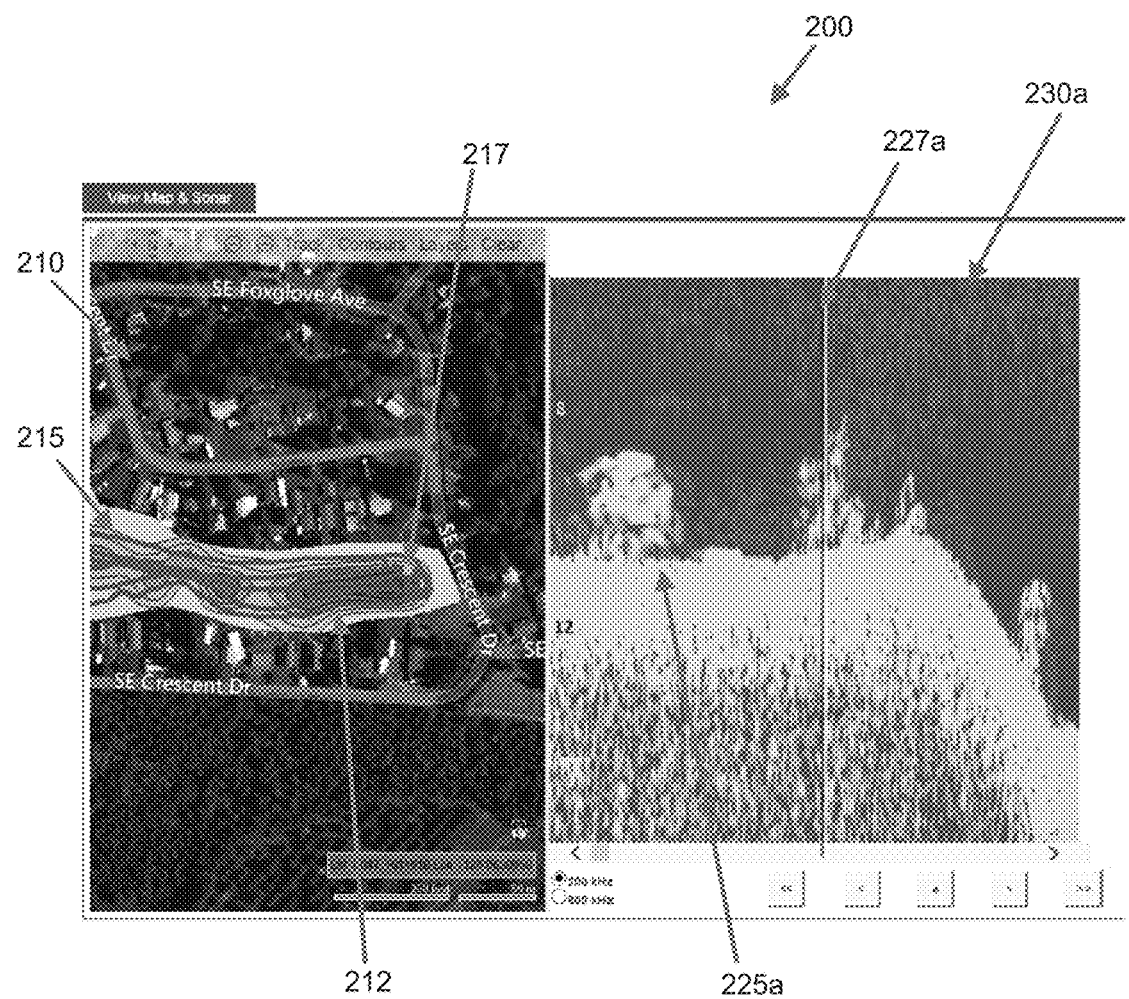
Figure 5:
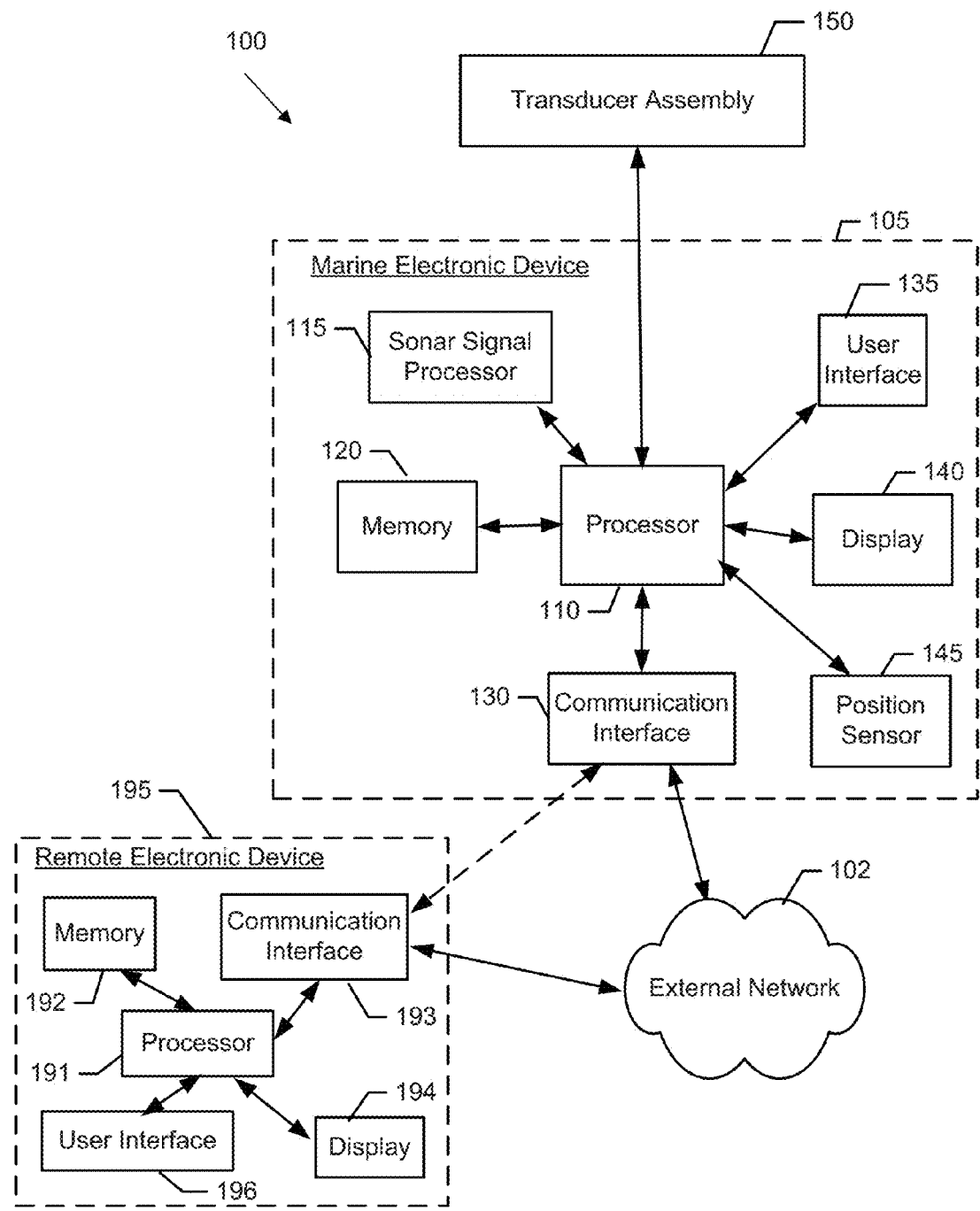
Figure 6:
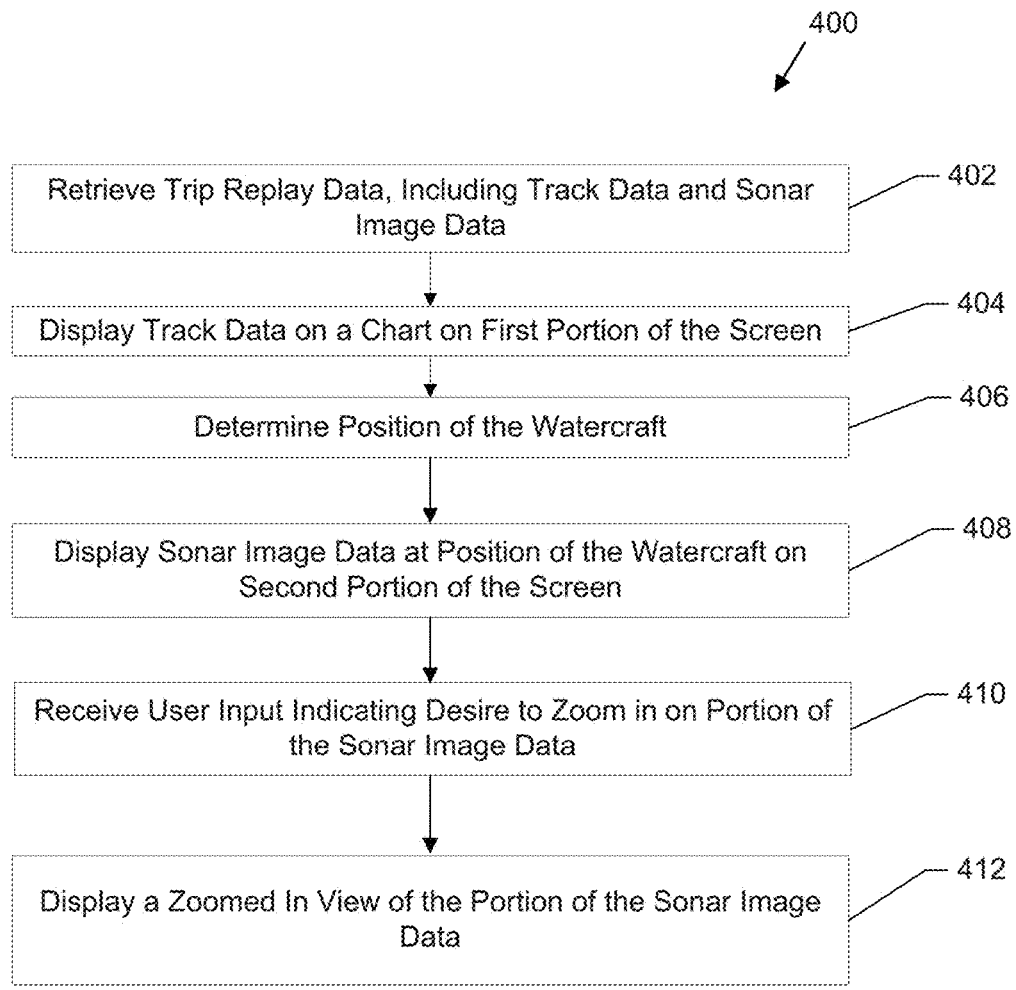

Having thus described the invention in general terms, reference will now be made to the accompanying drawings, which are not necessarily drawn to scale, and wherein:

FIG. 1 illustrates a watercraft emitting one or more sonar beams into a body of water, in accordance with some embodiments discussed herein;

FIG. 2 shows an example screen where an image of a trip replay for a past trip is displayed in a first portion and sonar imagery corresponding to the past trip is displayed in a second portion, in accordance with some embodiments discussed herein;

FIG. 3 shows the example screen of FIG. 2 with a portion of the sonar imagery being zoomed in on, in accordance with some embodiments discussed herein;

FIG. 4 shows the example screen of FIG. 3, wherein the zoomed in sonar imagery has replaced the zoomed out sonar imagery shown in FIG. 2, in accordance with some embodiments discussed herein;

FIG. 5 shows a block diagram illustrating an example system for providing adjustable range viewing of sonar imagery, in accordance with some embodiments discussed herein; and FIG. 6 illustrates a flowchart of an example method of adjustable range viewing of sonar imagery according to some embodiments discussed herein.

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

Embodiments of the present invention provide systems and associated methods for providing improved sonar image viewing during trip replay. In particular, sonar image data gathered during a trip and replayed on a screen accounts for the entire range of possible depths of the body of water traveled during the trip. Sometimes, however, a large depth range may result in loss of detail captured during the portions of the trip taken in shallow water. For example, detail taken between 0 feet and 5 feet (such as for shallow water) may not be visible because the entire range of depths accounts for the depth at the middle of the lake (e.g., 100 feet). In this regard, as described herein, embodiments of the present invention seek to provide improved viewing capabilities for portions of the sonar image during trip replay (e.g., zoomed in view, bottom lock, canopy lock).

In some embodiments, the system 100 may be configured to track the travel path of the watercraft on a body of water. In this regard, the system 100 (e.g., through the position sensor 145 of FIG. 5) may be configured to determine the location of the watercraft during a trip and keep a log of the locations traveled. The system 100 may be configured to store the traveled path (e.g., in memory 120 of FIG. 5) as track data corresponding to a trip. In some embodiments, the track data may be associated with a chart image of the body of water.

In some embodiments, the system 100 may be configured to capture and/or receive sonar data, such as from the transducer assembly (e.g., transducer assembly 15, 150) associated with an underwater environment relative to the watercraft. As detailed herein, using the sonar data, the system 100 may be configured to form sonar image data. The sonar image data can be used to form a sonar image that can be displayed to a user on a display (e.g., display 140 or display 194). In some embodiments, the sonar data may be used to determine the depth at a given location.

For example, with reference to FIG. 1, a watercraft 10 may include a sonar system that includes a transducer assembly 15. The transducer assembly 15 can be attached to the watercraft 10 and configured to transmit one or more sonar beams 12 (shown based on theoretical −3 dB range) into the underwater environment. Sonar signals from the one or more sonar beams can reflect off objects (such as the floor 14 of the body of water) and return (as sonar returns) to the transducer assembly 15. The transducer assembly 15 (such as through one or more transducers) is configured to convert the sonar returns into electrical energy to form sonar data. This sonar data is received by one or more marine electronic devices (e.g., marine electronic device 105 in FIG. 5) and used to generate an image of the underwater environment (e.g., a sonar image) that can be presented on a display (e.g., display 140/194 in FIG. 5).

Though the example illustrated transducer assembly 15 is attached so as to transmit the sonar beams 12 generally downwardly and to the side of the watercraft, other orientations/directions of the transducer assembly 15 are contemplated (e.g., forward facing, rearward facing, downward facing only, side facing only, among others without limitation). Likewise, while the example illustrated transducer assembly 15 is shown as a single sonar beam that has a fan-shape corresponding to a linear transducer, other sonar beam shapes (e.g., conical, elliptical, etc.), transducer shapes (circular, square, etc.), and number of transducers are contemplated by the present invention without limitation.

In some embodiments, the sonar system 100 may be configured to determine the location corresponding to the received sonar data. For example, the sonar system may use the position sensor 145 to obtain a location of the watercraft when the sonar data is received.

In some embodiments, the system 100 may be configured to store the track data and the sonar image data to form trip replay data. For example, trip replay data may include track data associated with a traveled path of the watercraft during a past trip. Trip replay data may also include sonar image data associated with sonar images that were captured by a sonar system (e.g., a transducer assembly) attached to the watercraft during the past trip. In this regard, a detailed log of the traveled path and corresponding sonar images during a past trip can be saved and played back later by a user.

In some embodiments, the system 100 may be configured to display the track data on a chart such that the traveled path is displayed over the chart. In some embodiments, the track data and chart may be displayed on a first portion of a screen of a display (e.g., display 140 or 194 of FIG. 5). For example, FIG. 2 shows an example screen 200 with a chart 212 and track data 215 being displayed on a first portion (left portion).

The track data of the trip replay data may be played back or currently displayed as being generated to a user. For example, such a display may occur on a display of a marine electronic device on the watercraft (e.g., marine electronic device 105). In some cases, the display may be updated in real-time, such as while the track data is being gathered. Alternately, the display may show the track data from a past trip. Similarly, in some embodiments, a user may utilize a remote electronic device (e.g., remote electronic device 195) for viewing the track data (and trip replay data in general). Such an application may be in the form of a web viewer. Further information regarding an example trip replay system is described in U.S. patent application Ser. No. 14/673,459, entitled "Trip Replay for an Aquatic Geographic Information System", filed Mar. 30, 2015, which is assigned to the assignee of the present application and incorporated herein by reference.

In some embodiments, the system 100 may be configured to determine a position of a watercraft along the traveled path of the track data. For example, a user may select a position along the traveled path as represented by the displayed track data. Alternatively, the system 100 may be configured to determine the position of the watercraft as part of a playback or "running" of the track data. For example, FIG. 2 illustrates a highlighted position 217 (e.g., an orange dot) of the watercraft along the track 215.

In some embodiments, the system 100 may be configured to determine sonar image data associated with the determined position of the watercraft. Such sonar image data may correspond to sonar image data captured (e.g., taken) while the watercraft was at the determined position during the past trip of the trip replay data.

In some embodiments, the system 100 may be configured to display the sonar image data captured at the position of the watercraft. In some embodiments, the sonar image data may be displayed as a sonar image on a second portion of a screen of a display (e.g., display 140 or 194 of FIG. 5) along with the track data that is being displayed on the first portion of the screen. For example, FIG. 2 shows an example screen 200 with a chart 212 and track data 215 being displayed on a first portion (left portion) and a sonar image 220 displayed on a second portion (right portion). In the depicted embodiment, the sonar image 220 includes a location indication line 227 that denotes the slice of sonar image data captured when the watercraft was at the current position 217.

As noted above, depending on the depth range shown in the image and the depth of the portion of the sonar image that the user is interested in, there may be additional detail not currently visible or discernible on the screen. For example, the sonar image 220 shown in FIG. 2 illustrates that there are varying depths to the bottom 225 of the body of water. Near the left side of the sonar image 220, the depth to the bottom 225 is approximately 11 feet (see 223). However, near the right side of the sonar image 220, the depth to the bottom 225 changes and is, instead, approximately 22 feet (see 224).

To obtain a view that shows more detail (or other reasons), the user may wish to zoom in on a certain portion of the sonar image (e.g., the left side). As such, in some embodiments, the system 100 may be configured to receive user input (e.g., through the user interface 135 or 196 in FIG. 5) indicating a desire to zoom in on a portion of the sonar image data being displayed. Such user input may come in any form. For example, the user may indicate a portion of the sonar image and select a zoom button or option accessible via the user interface 135 of the marine electronic device 105 or the user interface 196 of the remote electronic device 195. In some embodiments, the screen displaying the chart/track data and/or the sonar image data may be a touchscreen, and a user may apply user input directly to the touchscreen. For example, a user may use a zoom in gesture (e.g., a reverse pinch gesture) to indicate the portion of the sonar image data to zoom in on. Further, the user input may indicate the degree of zoom that the user desires. For example, the further a user spreads their fingers in a reverse pinch gesture, the higher degree of zoom desired.

In response to receiving the user input, the system 100 may be configured to cause display of a zoomed in view of the portion of the sonar image data. In some embodiments, the system 100 may be configured to determine the portion of the sonar image data and the desired zoom level prior to causing display of the zoomed in view of the portion of the sonar image data. For example, FIG. 3 illustrates an example zoomed in view 230a of the portion 230 of the sonar image data 220. In the depicted example, the zoomed in view 230a provides additional detail of the sonar image data. For example, the vegetation 245 is enlarged with additional detail now more readily discernible and visible. Further, the zoomed in view shows a close up view of the bottom 225a and also displays an indicator line 227a corresponding to the position of the watercraft 217 along the track 215 (if appropriate).

In some embodiments, the system 100 may be configured to display the zoomed in view of the sonar image data in any number of different ways. For example, FIG. 3 depicts an example embodiment where the zoomed in view is displayed as a separate pop-up window. Another example embodiment is shown in FIG. 4, where the zoomed in view 230a replaces the overall sonar image 220 shown in FIG. 2.

In some embodiments, such as when the zoomed in view is displayed as a separate pop-up window, the system 100 may be configured to receive the user input in the form of hovering over the portion of the sonar image data. In this regard, the separate pop-up window may operate as a preview of the zoomed in view. Further, in some embodiments, if the hovered over portion is selected, the overall sonar image 220 may be replaced by the zoomed in view 230a of the sonar image data (such as shown in FIG. 4).

Though the above described embodiments focus on zooming in, embodiments of the present invention also contemplate zooming out. Similarly, in some embodiments, the system 100 may be configured to enable panning (e.g., up or down or left or right) of the zoomed in view of the sonar image data. For example, when the zoomed in view is displayed, the system 100 may be configured to receive second user input indicating a desire to pan the portion of the sonar image data that is being zoomed in on in a direction (e.g., up, down, left, or right). In response, the system 100 may be configured to cause panning of the zoomed in view of the portion of the sonar image data in the corresponding direction.

Some embodiments of the present invention contemplate providing further features that may be useful to a viewer. For example, in some embodiments, the system 100 may be configured to playback the trip replay such that the sonar image data and the depicted position of the watercraft replay the trip. In this regard, the position of the watercraft and the corresponding sonar image data move on the screen (e.g., like watching a video replay over time). Such playback can occur in forward or reverse and can be played at varying speeds.

In some embodiments, the system 100 may be configured to provide a "bottom lock" feature, such as in response to user input indicating a desire to lock the zoomed in view onto the bottom of the body of water. Such a feature will determine a zoomed in view that focuses on the bottom and update the zoomed in view accordingly.

In this regard, in some embodiments, the system 100 may be configured to determine (e.g., with processor 110 or 191 in FIG. 5) a depth associated with the bottom of the body of water at the position of the watercraft. This determination could be accomplished in any number of different ways. In one example embodiment, the system 100 may be configured to determine the depth at the current position of the watercraft based on stored depth data from the sonar data used for the sonar image data. In another example embodiment, the system 100 may be configured to determine the depth using image discerning software to determine the depth as shown in the sonar image. Once the depth is determined, the system 100 may be configured to determine the portion of the sonar image data to be zoomed in on such that the bottom of the body of water is within the portion of the sonar image data. In some embodiments, such an example image may include a determination of a range of depths around the determined depth of the bottom, such as based on the indicated zoom level. Additionally or alternatively, the size of the image around the determined depth associated with the bottom may be predetermined (or configured). In some embodiments, the bottom of the body of water may be centered in the zoomed in view. The displayed zoomed in view of the sonar image data may be updated accordingly. In some embodiments, the bottom lock feature may occur during playback or not during playback. Either way, this may result in an easy to use feature that automatically determines and zooms in on the bottom.

In some embodiments, the bottom lock may automatically update the zoomed in sonar image such that it changes (e.g., moves up or down) to continue to focus (or "lock" onto the bottom) as the sonar image data plays back. In this regard, the depth determination may be continually updated as the watercraft "travels" along the track during the playback. As such, the system 100 may be configured to, as the position of the watercraft changes, automatically determine the portion of the sonar image data to be zoomed in on such that the bottom of the body of water is within the portion of the sonar image data. This would cause the zoomed in view to lock onto the bottom of the body of water as the position of the watercraft and corresponding displayed sonar image data changes. For example, with reference to FIG. 2, as the watercraft 217 moves forward along the track 215, the sonar image data will scroll from right to left (with the indicator line 227 denoting the sonar image data corresponding to the "new" position of the watercraft). As the sonar image data scrolls past the indicator line 227, the depth of the bottom 225 changes. Using bottom lock, the system 100 would follow the bottom 225 by changing the portion of the sonar image data that is being zoomed in on.

In some embodiments, the system 100 may be configured to provide a "canopy lock" feature, such as in response to user input indicating a desire to lock the zoomed in view onto vegetation within the body of water. Such a feature will determine a zoomed in view that focuses on vegetation in the sonar image and update the zoomed in view accordingly.

In this regard, in some embodiments, the system 100 may be configured to determine (e.g., with processor 110 or 191 in FIG. 5) a depth associated with vegetation within the body of water at the position of the watercraft. This determination could be accomplished in any number of different ways. In one example embodiment, the system 100 may be configured to determine the vegetation at the current position of the watercraft based on stored depth data associated with vegetation from the sonar data used for the sonar image data. In another example embodiment, the system 100 may be configured to determine the depth of the vegetation using image discerning software to determine the depth as shown in the sonar image. Once the depth of the vegetation is determined, the system 100 may be configured to determine the portion of the sonar image data to be zoomed in on such that the vegetation within the body of water is within the portion of the sonar image data. In some embodiments, such an example image may include a determination of the overall size of the vegetation. Additionally or alternatively, the size of the image around the determined depth associated with the vegetation may be predetermined (or configured). In some embodiments, the center of the vegetation within the body of water may be centered in the zoomed in view. The displayed zoomed in view of the sonar image data may be updated accordingly. In some embodiments, the canopy lock feature may occur during playback or not during playback. Either way, this may result in an easy to use feature that automatically determines and zooms in on the canopy.

In some embodiments, the canopy lock may automatically update the zoomed in sonar image such that it changes (e.g., moves up or down) to continue to focus (or "lock" onto the vegetation) as the sonar image data plays back. In this regard, the depth determination for the vegetation may be continually updated as the watercraft "travels" along the track during the playback. In this regard, the system 100 may be configured to, as the position of the watercraft changes, automatically determine the portion of the sonar image data to be zoomed in on such that the vegetation within the body of water is within the portion of the sonar image data. This would cause the zoomed in view to lock onto the vegetation within the body of water as the position of the watercraft and corresponding displayed sonar image data changes. For example, with reference to FIG. 3, as the watercraft 217 moves forward along the track 215, the sonar image data will scroll from right to left (with the indicator line 227 denoting the sonar image data corresponding to the "new" position of the watercraft). As the sonar image data scrolls past the indicator line 227, the depth of the vegetation (e.g., 245) changes. Using canopy lock, the system 100 would follow the vegetation by changing the portion of the sonar image data that is being zoomed in on.

Depending on the configuration of the depth range gathered by the sonar image data during the trip, there may be additional or unused depth readings that extend past the bottom of the body of water. For example, the depth range of the sonar system may be set to 150 feet, but the ultimate depth of the bottom of the body of water may only reach 120 feet. In such an example, depth readings from 120 feet-150 feet are extra and unnecessary. For example, with reference to FIG. 2, there are extra depth readings 252 below the bottom 225 at the lowest point. In some embodiments, the system 100 may be configured to identify and remove the extra sonar image data. As a result, the system 100 may be configured to update the sonar image to zoom in on the remaining sonar image data. In some embodiments, to accomplish this, the system 100 may be configured to determine a lowest point of a bottom of the body of water within the sonar image data. This may be the lowest point for the entire body of water, the entire trip, or the currently displayed sonar image data. For example, the system 100 may determine that the lowest point of the bottom is 22 feet. After determining the lowest point, the system 100 may be configured to determine and remove the portion of the sonar image data below the lowest point to enable a higher resolution image (e.g., a zoomed in view) of the remaining sonar image data. This removal could occur temporarily or permanently.

Example System Architecture

FIG. 5 shows a block diagram of an example system 100 capable for use with several embodiments of the present invention. As shown, the system 100 may include a number of different modules or components, each of which may comprise any device or means embodied in either hardware, software, or a combination of hardware and software configured to perform one or more corresponding functions. For example, the system 100 may include a transducer assembly 150, a marine electronic device 105, and a remote electronic device 195.

The system 100 may also include one or more communications modules configured to communicate with one another in any of a number of different manners including, for example, via a network. In this regard, the communication interfaces (e.g., 130, 193) may include any of a number of different communication backbones or frameworks including, for example, Ethernet, the NMEA 2000 framework, GPS, cellular, WiFi, or other suitable networks. The network may also support other data sources, including GPS, autopilot, engine data, compass, radar, etc. Numerous other peripheral devices such as one or more wired or wireless multi-function displays (e.g., a marine electronic device 105) may be included in the system 100.

The marine electronic device 105 may include a processor 110, a sonar signal processor 115, a memory 120, a user interface 135, a display 140, one or more sensors (e.g., position sensor 145, orientation sensor (not shown), etc.), and a communication interface 130.

The processor 110 (e.g., a sonar signal processor 115) may be any means configured to execute various programmed operations or instructions stored in a memory device such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the processor 110 as described herein. In this regard, the processor 110 may be configured to analyze electrical signals communicated thereto to provide sonar data indicative of the size, location, shape, etc. of objects detected by the system 100. For example, the processor 110 may be configured to receive sonar return data and process the sonar return data to generate sonar image data for display to a user (e.g., on display 140).

In some embodiments, the processor 110 may be further configured to implement signal processing or enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other watercraft, etc.

The memory 120 may be configured to store instructions, computer program code, marine data, such as sonar data, chart data, location/position data, and other data associated with the sonar system in a non-transitory computer readable medium for use, such as by the processor.

The communication interface 130 may be configured to enable connection to external systems (e.g., an external network 102 or a remote electronic device 195). In this manner, the marine electronic device 105 may retrieve stored data from a remote, external server via the external network 102 or directly from a remote electronic device 195 in addition to or as an alternative to the onboard memory 120.

The position sensor 145 may be configured to determine the current position and/or location of the marine electronic device 105. For example, the position sensor 145 may comprise a GPS or other location detection system.

The display 140 may be configured to display images and may include or otherwise be in communication with a user interface 135 configured to receive input from a user. The display 140 may be, for example, a conventional LCD (liquid crystal display), a touch screen display, mobile device, or any other suitable display known in the art upon which images may be displayed.

In any of the embodiments, the display 140 may present one or more sets of marine data (or images generated from the one or more sets of data). Such marine data includes chart data, radar data, weather data, location data, position data, orientation data, sonar data, or any other type of information relevant to the watercraft. In some embodiments, the display may be configured to present such marine data simultaneously as in split-screen mode. In some embodiments, a user may select any of the possible combinations of the marine data for display.

The user interface 135 may include, for example, a keyboard, keypad, function keys, mouse, scrolling device, input/output ports, touch screen, or any other mechanism by which a user may interface with the system.

Although the display 140 of FIG. 5 is shown as being directly connected to the processor 110 and within the marine electronic device 105, the display 140 could alternatively be remote from the processor 110 and/or marine electronic device 105. Likewise, in some embodiments, the sonar signal processor 115, the position sensor 145, and/or user interface 135 could be remote from the marine electronic device 105.

The remote electronic device 195 may include components (hardware or software) that are configured according to any of the example embodiments detailed herein in the same manner as those of the marine electronic device 105. For example, the remote electronic device 195 may include a processor 191, a memory 192, a user interface 196, a display 194, and a communication interface 193. Each component of the remote electronic device 195 may be configured in accordance with the same component of the marine electronic device 105. In this regard, as detailed herein, embodiments of the present invention contemplate operation and/or use with either or both of the marine electronic device 105 or the remote electronic device 195.

The transducer assembly 150 according to an exemplary embodiment may be provided in one or more housings that provide for flexible mounting options with respect to the watercraft. In this regard, for example, the housing may be mounted onto the hull of the watercraft or onto a device or component that may be attached to the hull (e.g., a trolling motor or other steerable device, or another component that is mountable relative to the hull of the vessel), including a bracket that is adjustable on multiple axes, permitting omni-directional movement of the housing.

The transducer assembly 150 may include one or more transducers or transducer elements positioned within the housing. Each transducer may be configured as transmit/receive, transmit-only, or receive-only with respect to transmitting one or more sonar beams and receiving sonar returns. In some embodiments, each of the transducer elements may be positioned within the housing so as to point toward a predetermined area under, to the side, or the front of the watercraft. The shape of a transducer element may largely determine the type of beam that is formed when that transducer element transmits a sonar pulse (e.g., a circular transducer element emits a cone-shaped beam, a linear transducer emits a fan-shaped beam, etc.). Embodiments of the present invention are not limited to any particular shape transducer. Likewise, transducer elements may comprise different types of materials that cause different sonar pulse properties upon transmission. For example, the type of material may determine the strength of the sonar pulse. Additionally, the type of material may affect the sonar returns received by the transducer element. As such, embodiments of the present invention are not meant to limit the shape or material of the transducer elements. Further, transducers may configured to transmit and/or receive at different frequencies. In this regard, embodiments of the present invention are not meant to be limited to certain frequencies.

Additionally, in some embodiments, the transducer assembly 150 may have a sonar signal processor (e.g., sonar signal processor 115) and/or other components positioned within the housing. For example, one or more transceivers (e.g., transmitter/receiver), transmitters, and/or receivers may be positioned within the housing and configured to cause the one or more transducers to transmit sonar beams and/or receive sonar returns from the one or more transducers. In some embodiments, the sonar signal processor, transceiver, transmitter, and/or receiver may be positioned in a separate housing.

Example Flowchart(s) and Operations

Embodiments of the present invention provide methods, apparatuses and computer program products for providing a zoomed in view of sonar image data during a trip replay. Various examples of the operations performed in accordance with embodiments of the present invention will now be provided with reference to FIG. 6.

FIG. 6 illustrates a flowchart according to an example method for providing a zoomed in view of sonar image data during a trip replay according to an example embodiment 400. The operations illustrated in and described with respect to FIG. 6 may, for example, be performed by, with the assistance of, and/or under the control of one or more of the processor 110/191, sonar signal processor 115, memory 120/192, communication interface 130/193, user interface 135/196, position sensor 145, display 140/194, and/or transducer assembly 150. Operation 402 may comprise retrieving trip replay data, including track data and sonar image data. The processor 110/191, sonar signal processor 115, memory 120/192, and/or transducer assembly 150 may, for example, provide means for performing operation 402. Operation 404 may comprise causing display of track data on a chart on a first portion of the screen. The processor 110/191, communication interface 130/193, display 140/194, and/or memory 120/192 may, for example, provide means for performing operation 404. Operation 406 may comprise determining a position of the watercraft. The processor 110/191, memory 120/192, position sensor 145, and/or communication interface 130/193 may, for example, provide means for performing operation 406. Operation 408 may comprise causing display of sonar image data captured at that position of the watercraft on a second portion of the screen. The processor 110/191, communication interface 130/193, display 140/194, and/or memory 120/192 may, for example, provide means for performing operation 408. Operation 410 may comprise receiving user input indicating a desire to zoom in on a portion of the sonar image data. The user interface 135/196, communication interface 130/193, display 140/194, and/or memory 120/192 may, for example, provide means for performing operation 410. Operation 412 may comprise causing display of a zoomed in view of the portion of the sonar image data. The processor 110/191, communication interface 130/193, display 140/194, and/or memory 120/192 may, for example, provide means for performing operation 412.

FIG. 6 illustrates a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 120/192 and executed by, for example, the processor 110/191 or sonar signal processor 115. As will be appreciated, any such computer program product may be loaded onto a computer or other programmable apparatus (for example, a marine electronic device 105 and/or remote electronic device 195) to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device (for example, a marine electronic device 105 and/or remote electronic device 195) to cause a series of operations to be performed on the computer or other programmable apparatus to produce a computer-implemented process such that the instructions which execute on the computer or other programmable apparatus implement the functions specified in the flowchart block(s).

Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

The invention claimed is:

1. An apparatus comprising a processor and a memory including computer program code, the memory and the computer program code configured to, with the processor, cause the apparatus to:
   retrieve trip replay data associated with a past trip of a user of a watercraft on a body of water, wherein the trip replay data includes track data associated with a traveled path of the watercraft during the past trip and sonar image data associated with sonar images that were captured by a sonar system attached to the watercraft during the past trip;
   display, on a first portion of a screen, the track data on a chart such that the traveled path of the watercraft during the past trip is displayed over the chart;
   determine the position of the watercraft along the traveled path;
   display, on a second portion of the screen, the sonar image data captured at the position of the watercraft such that the sonar image data corresponding to a first depth range is viewable on the second portion of the screen;
   receive user input indicating a desire to zoom in on a portion of the sonar image data being displayed; and
   display a zoomed in view of the portion of the sonar image data such that the sonar image data corresponding to a second depth range is viewable, wherein the second depth range is less than the first depth range.

2. The apparatus of claim 1, wherein the user input further indicates a desire to lock the zoomed in view onto a bottom of the body of water, wherein the memory and the computer program code are further configured to, with the processor, cause the apparatus to:
   determine a depth associated with the bottom of the body of water at the position of the watercraft, wherein the position of the watercraft corresponds to the displayed sonar image data; and
   determine, based on the determined depth, the portion of the sonar image data to be zoomed in on such that the bottom of the body of water is within the portion of the sonar image data, wherein the second depth range corresponding to the determined portion includes the determined depth.

3. The apparatus of claim 2, wherein the memory and the computer program code are further configured to, with the processor, cause the apparatus to, as the position of the watercraft changes, automatically determine the portion of the sonar image data to be zoomed in on such that the bottom of the body of water is within the portion of the sonar image data and automatically cause the zoomed in view to adjust the second depth range corresponding to the automatically determined portion of the sonar image data so as to lock onto the bottom of the body of water as the position of the watercraft and corresponding displayed sonar image data changes.

4. The apparatus of claim 1, wherein the user input further indicates a desire to lock the zoomed in view onto vegetation within the body of water, wherein the memory and the computer program code are further configured to, with the processor, cause the apparatus to:
   determine a depth associated with vegetation within the body of water at the position of the watercraft, wherein the position of the watercraft corresponds to the displayed sonar image data; and determine, based on the determined depth, the portion of the sonar image data to be zoomed in on such that the vegetation within the body of water is within the portion of the sonar image data, wherein the second depth range corresponding to the determined portion includes the determined depth.

5. The apparatus of claim 4, wherein the memory and the computer program code are further configured to, with the processor, cause the apparatus to, as the position of the watercraft changes, automatically determine the portion of the sonar image data to be zoomed in on such that the vegetation within the body of water is within the portion of the sonar image data and automatically cause the zoomed in view to adjust the second depth range corresponding to the automatically determined portion of the sonar image data so as to lock onto the vegetation within the body of water as the position of the watercraft and corresponding displayed sonar image data changes.

6. The apparatus of claim 1, wherein the memory and the computer program code are further configured to, with the processor, cause the apparatus to:
determine a lowest point of a bottom of the body of water within the sonar image data; and
remove a portion of the sonar image data below the lowest point of the bottom from the trip replay data to enable a higher resolution image of remaining sonar image data.

7. The apparatus of claim 1, wherein the received user input includes hovering over the portion of the sonar image data being displayed, and wherein the memory and the computer program code are further configured to, with the processor, cause the apparatus to display the zoomed in view of the portion of the sonar image data by displaying a separate pop-up window of the zoomed in view of the portion of the sonar image data.

8. The apparatus of claim 1, wherein the memory and the computer program code are further configured to, with the processor, cause the apparatus to display the zoomed in view of the portion of the sonar image data by replacing the sonar data that was being displayed on the second portion of the screen with the zoomed in view of the portion of the sonar image data.

9. The apparatus of claim 1, wherein the memory and the computer program code are further configured to, with the processor, cause the apparatus to:
receive second user input indicating a desire to pan the portion of the sonar image data that is being zoomed in on in one of an up direction, a down direction, a left direction, or a right direction; and
cause panning of the zoomed in view of the portion of the sonar image data in the indicated up direction, down direction, left direction, or right direction.

10. A method comprising:
retrieving trip replay data associated with a past trip of a user of a watercraft on a body of water, wherein the trip replay data includes track data associated with a traveled path of the watercraft during the past trip and sonar image data associated with sonar images that were captured by a sonar system attached to the watercraft during the past trip;
displaying, on a first portion of a screen, the track data on a chart such that the traveled path of the watercraft during the past trip is displayed over the chart;
determining the position of the watercraft along the traveled path;
displaying, on a second portion of the screen, the sonar image data captured at the position of the watercraft such that the sonar image data corresponding to a first depth range is viewable on the second portion of the screen;
receiving user input indicating a desire to zoom in on a portion of the sonar image data being displayed; and
displaying a zoomed in view of the portion of the sonar image data such that the sonar image data corresponding to a second depth range is viewable, wherein the second depth range is less than the first depth range.

11. The method of claim 10, wherein the user input further indicates a desire to lock the zoomed in view onto a bottom of the body of water, wherein the method further comprises:
determining a depth associated with the bottom of the body of water at the position of the watercraft, wherein the position of the watercraft corresponds to the displayed sonar image data; and
determining, based on the determined depth, the portion of the sonar image data to be zoomed in on such that the bottom of the body of water is within the portion of the sonar image data, wherein the second depth range corresponding to the determined portion includes the determined depth.

12. The method of claim 11 further comprising, as the position of the watercraft changes, automatically determining the portion of the sonar image data to be zoomed in on such that the bottom of the body of water is within the portion of the sonar image data and automatically causing the zoomed in view to adjust the second depth range corresponding to the automatically determined portion of the sonar image data so as to lock onto the bottom of the body of water as the position of the watercraft and corresponding displayed sonar image data changes.

13. The method of claim 10, wherein the user input further indicates a desire to lock the zoomed in view onto vegetation within the body of water, wherein the method further comprises:
determining a depth associated with vegetation within the body of water at the position of the watercraft, wherein the position of the watercraft corresponds to the displayed sonar image data; and
determining, based on the determined depth, the portion of the sonar image data to be zoomed in on such that the vegetation within the body of water is within the portion of the sonar image data, wherein the second depth range corresponding to the determined portion includes the determined depth.

14. The method of claim 13 further comprising, as the position of the watercraft changes, automatically determining the portion of the sonar image data to be zoomed in on such that the vegetation within the body of water is within the portion of the sonar image data and automatically causing the zoomed in view to adjust the second depth range corresponding to the automatically determined portion of the sonar image data so as to lock onto the vegetation within the body of water as the position of the watercraft and corresponding displayed sonar image data changes.

15. The method of claim 10 further comprising:
determining a lowest point of a bottom of the body of water within the sonar image data; and
removing a portion of the sonar image data below the lowest point of the bottom from the trip replay data to enable a higher resolution image of remaining sonar image data.

16. A non-transitory computer-readable medium comprised of at least one memory device having computer program instructions stored thereon, the computer program instructions being configured, when run by a processor, to:

retrieve trip replay data associated with a past trip of a user of a watercraft on a body of water, wherein the trip replay data includes track data associated with a traveled path of the watercraft during the past trip and sonar image data associated with sonar images that were captured by a sonar system attached to the watercraft during the past trip;

display, on a first portion of a screen, the track data on a chart such that the traveled path of the watercraft during the past trip is displayed over the chart;

determine the position of the watercraft along the traveled path;

display, on a second portion of the screen, the sonar image data captured at the position of the watercraft such that the sonar image data corresponding to a first depth range is viewable on the second portion of the screen;

receive user input indicating a desire to zoom in on a portion of the sonar image data being displayed; and display a zoomed in view of the portion of the sonar image data such that the sonar image data corresponding to a second depth range is viewable on the second portion of the screen, wherein the second depth range is less than the first depth range.

17. The computer-readable medium of claim 16, wherein the user input further indicates a desire to lock the zoomed in view onto a bottom of the body of water, wherein the computer program instructions are further configured, when run by the processor, to:

determine a depth associated with the bottom of the body of water at the position of the watercraft, wherein the position of the watercraft corresponds to the displayed sonar image data; and determine, based on the determined depth, the portion of the sonar image data to be zoomed in on such that the bottom of the body of water is within the portion of the sonar image data, wherein the second depth range corresponding to the determined portion includes the determined depth.

18. The computer-readable medium of claim 17, wherein the computer program instructions are further configured, when run by the processor, to, as the position of the watercraft changes, automatically determine the portion of the sonar image data to be zoomed in on such that the bottom of the body of water is within the portion of the sonar image data and automatically cause the zoomed in view to adjust the second depth range corresponding to the automatically determined portion of the sonar image data so as to lock onto the bottom of the body of water as the position of the watercraft and corresponding displayed sonar image data changes.

19. The computer-readable medium of claim 16, wherein the user input further indicates a desire to lock the zoomed in view onto vegetation within the body of water, wherein the computer program instructions are further configured, when run by the processor, to:

determine a depth associated with vegetation within the body of water at the position of the watercraft, wherein the position of the watercraft corresponds to the displayed sonar image data; and determine, based on the determined depth, the portion of the sonar image data to be zoomed in on such that the vegetation within the body of water is within the portion of the sonar image data, wherein the second depth range corresponding to the determined portion includes the determined depth.

20. The computer-readable medium of claim 19, wherein the computer program instructions are further configured, when run by the processor, to, as the position of the watercraft changes, automatically determine the portion of the sonar image data to be zoomed in on such that the vegetation within the body of water is within the portion of the sonar image data and automatically cause the zoomed in view to adjust the second depth range corresponding to the automatically determined portion of the sonar image data so as to lock onto the vegetation within the body of water as the position of the watercraft and corresponding displayed sonar image data changes.

21. The computer-readable medium of claim 16, wherein the computer program instructions are further configured, when run by the processor, to:

determine a lowest point of a bottom of the body of water within the sonar image data; and remove a portion of the sonar image data below the lowest point of the bottom from the trip replay data to enable a higher resolution image of remaining sonar image data.

* * * * *